United States Patent [19]

Oleck et al.

[11] Patent Number: 4,472,266

[45] Date of Patent: Sep. 18, 1984

[54] HYDRODEWAXING WITH MO, NI-MO, OR CO-MO ON ZSM-5 TYPE CATALYSTS

[75] Inventors: Stephen M. Oleck, Moorestown; Robert C. Wilson, Jr., Woodbury, both of N.J.

[73] Assignee: Mobil Oil Corporation, New York, N.Y.

[21] Appl. No.: 424,773

[22] Filed: Sep. 27, 1982

[51] Int. Cl.$^3$ .............................................. C10G 47/20
[52] U.S. Cl. ................................................... 208/111
[58] Field of Search ......................................... 208/111

[56] References Cited

U.S. PATENT DOCUMENTS

| | | | |
|---|---|---|---|
| 3,692,858 | 9/1972 | Brewer et al. | 208/58 |
| 3,968,024 | 7/1976 | Gorring et al. | 208/111 |
| 4,176,050 | 11/1979 | Chen et al. | 208/111 |
| 4,213,847 | 7/1980 | Chen et al. | 208/111 |
| 4,229,282 | 10/1980 | Peters et al. | 208/111 |
| 4,294,687 | 10/1981 | Pinaire et al. | 208/58 |
| 4,297,243 | 10/1981 | Moorehead | 208/111 |
| 4,313,817 | 2/1982 | Mayer et al. | 208/111 |
| 4,372,839 | 2/1983 | Oleck et al. | 208/97 |

*Primary Examiner*—Delbert E. Gantz
*Assistant Examiner*—Lance Johnson
*Attorney, Agent, or Firm*—A. J. McKillop; M. G. Gilman; J. F. Powers, Jr.

[57] ABSTRACT

A high quality lube base stock oil of low pour point and excellent stability is produced from a waxy crude oil fraction in a single-stage hydrodewaxing process by using an improved ZSM-5 type catalyst having nickel-molybdenum, cobalt-molybdenum or a molybdenum hydrogenation agent incorporated thereon.

6 Claims, 11 Drawing Figures

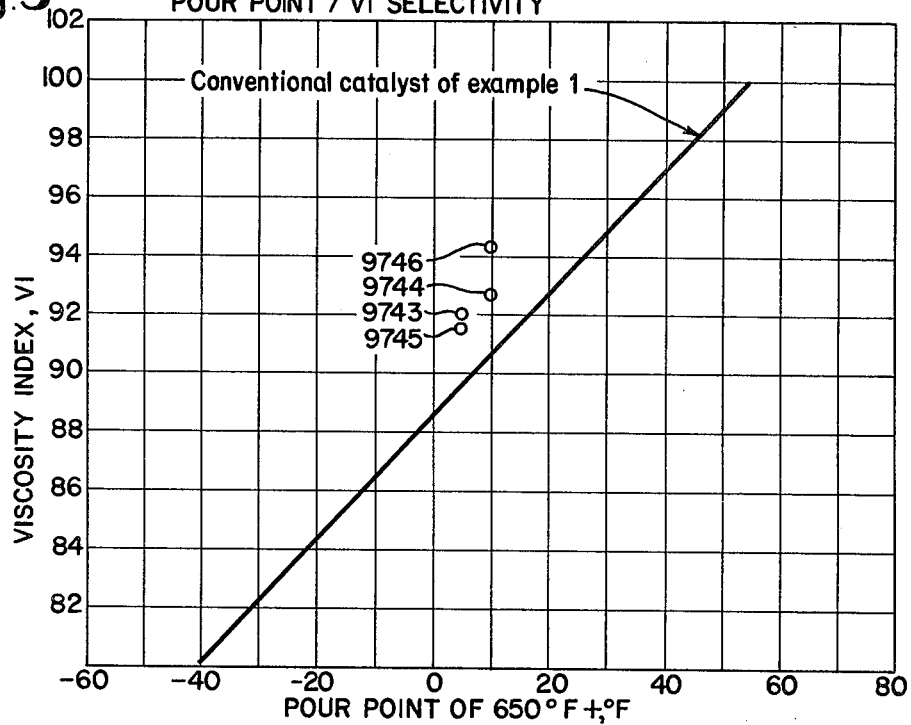
Fig.5 POUR POINT / VI SELECTIVITY
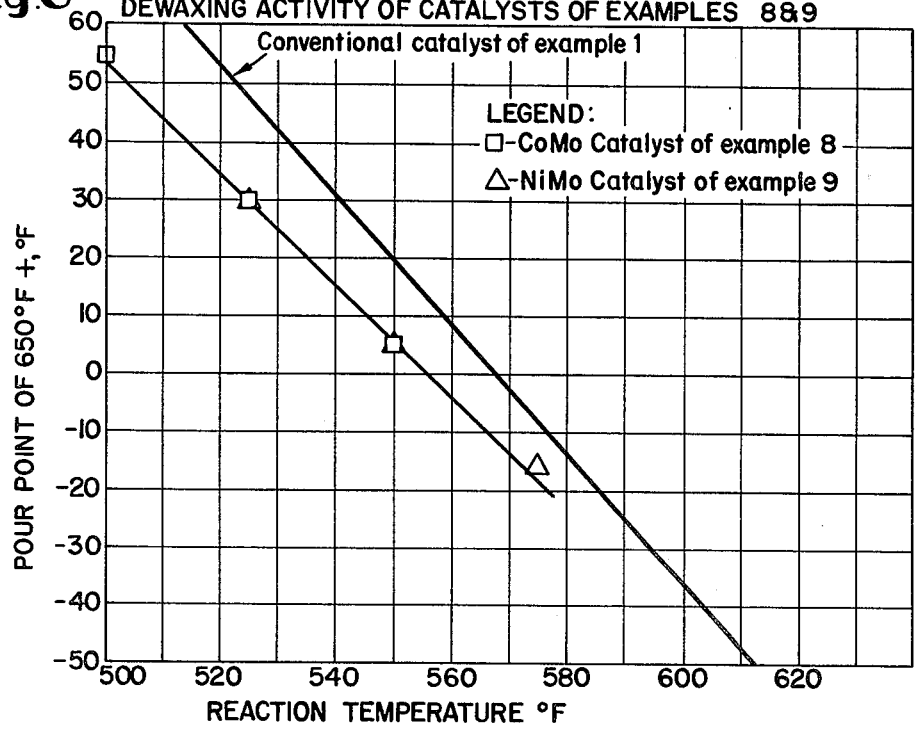
Fig.6 DEWAXING ACTIVITY OF CATALYSTS OF EXAMPLES 8 & 9

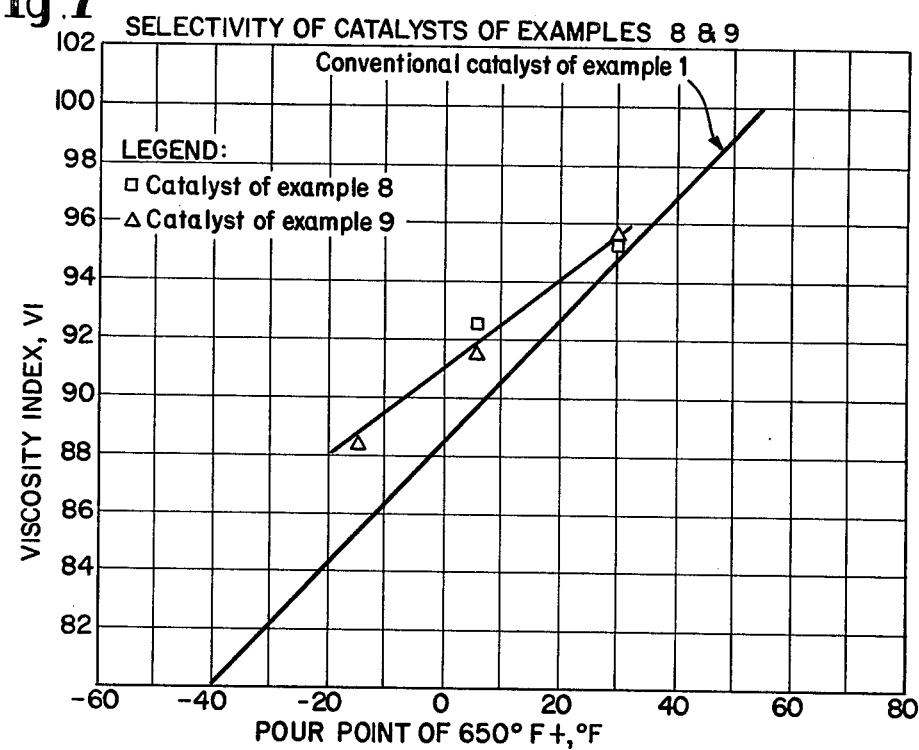
Fig.7 SELECTIVITY OF CATALYSTS OF EXAMPLES 8 & 9
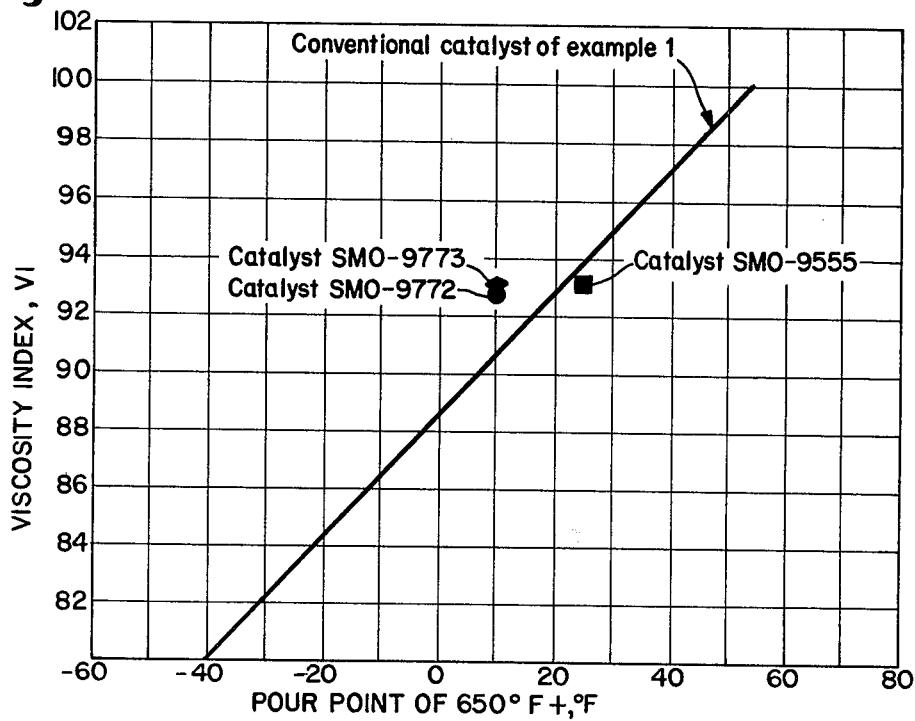
Fig.8

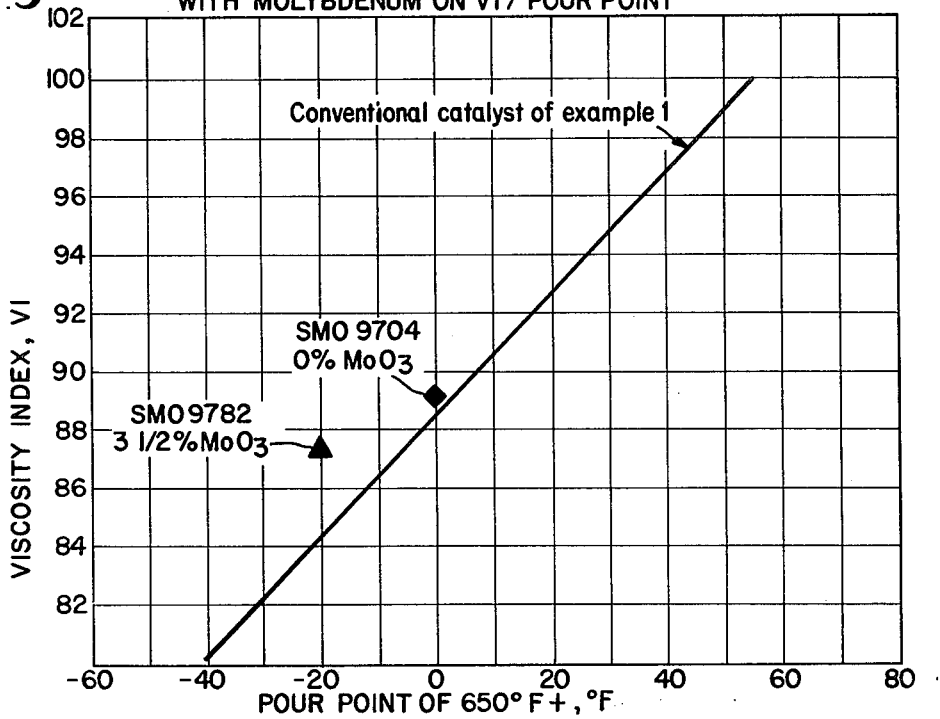
Fig. 9 EFFECT OF IMPREGNATING UNSTEAMED DEWAXING CATALYST WITH MOLYBDENUM ON VI / POUR POINT
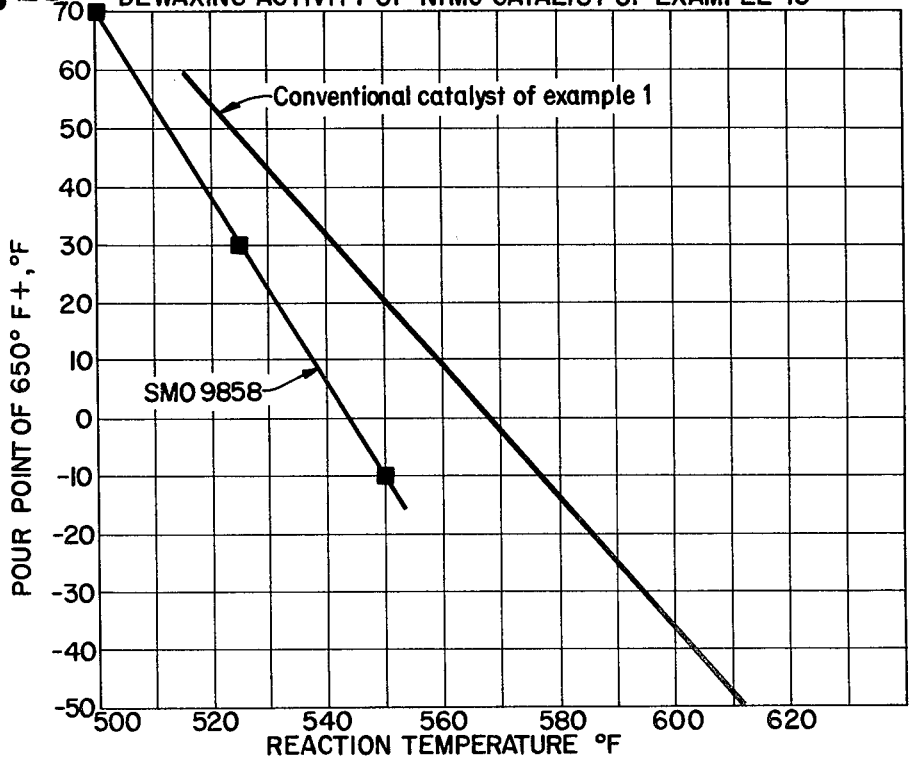
Fig. 10 DEWAXING ACTIVITY OF NiMo CATALYST OF EXAMPLE 13

HYDRODEWAXING WITH MO, NI-MO, OR CO-MO ON ZSM-5 TYPE CATALYSTS

BACKGROUND OF THE INVENTION

1. Field of the Invention

The invention is concerned with the manufacture of high grade viscous oil products from crude petroleum fractions. It is particularly directed to the manufacture of high quality lube base stock oils from crude stocks of high wax content, commonly classified as "wax base" as compared with the "naphthenic base" crudes. The latter crudes are relatively lean in straight chain paraffins and yield viscous fractions which inherently possess low pour points.

2. Description of the Prior Art

High quality lube base stock oils are conventionally prepared by refining distillate fractions or the residuum prepared by vacuum distilling a suitable crude oil from which the lighter portion has been removed by distillation in an atmospheric tower. Thus, the charge to the vacuum tower is commonly referred to as a "long residuum", and the residuum from the vacuum tower is distinguished from the starting material by referring to it as the "short residuum".

The vacuum distillate fractions are upgraded by a sequence of unit operations, the first of which is solvent extraction with a solvent selective for aromatic hydrocarbons. This step serves to remove aromatic hydrocarbons of low viscosity index and provides a raffinate of improved viscosity index and quality. Various processes have been used in this extraction stage and these employ solvents such as furfural, phenol, sulfur dioxide, and other. The short residuum, because it contains most of the asphaltenes of the crude oil, is conventionally treated to remove these asphalt-like constituents prior to solvent extraction to increase the viscosity index.

The raffinate from the solvent extraction step contains paraffins which adversely affect the pour point. Thus the waxy raffinate, regardless of whether prepared from a distillate fraction or from the short residuum, must be dewaxed. Various dewaxing procedures have been used, and the art has gone in the direction of treatment with a solvent such as MEK/toluene mixtures to remove the wax and prepare a dewaxed raffinate. The dewaxed raffinate may then be finished by any of a number of sorption or catalytic processes to improve color and oxidation stability.

The quality of the lube base stock oil prepared by the sequence of operations outlined above depends on the particular crude chosen as well as the severity of treatment for each of the treatment steps. Additionally, the yield of high quality lube base stock oil also depends on these factors and, as a rule, the higher the quality sought, the less the yield. In general, naphthenic crudes are favored because less loss is encountered, particularly in the dewaxing step. In many cases, however, waxy crudes are more readily available, and it would be desirable to provide a process for preparing high quality lube base stock oils in good yields from such waxy crude oils.

In recent years techniques have become available for catalytic dewaxing of petroleum stocks. A process of that nature developed by British Petroleum is described in The Oil and Gas Journal dated Jan. 6, 1975, at pp. 69-73. See also U.S. Pat. No. 3,668,113.

In U.S. Pat. No. Re. 28,398 is described a process for catalytic dewaxing with a catalyst comprising zeolite ZSM-5. Such process combined with catalytic hydrofinishing is described in U.S. Pat. No. 3,894,938.

In U.S. Pat. No. 4,137,148 is described a process for preparing specialty oils of very low pour point and excellent stability from a waxy crude oil distillate fraction by solvent refining, catalytic dewaxing over a zeolite catalyst such as ZSM-5, and hydrotreating, under specified condition. The entire contents of that patent are incorporated herein by reference.

In U.S. Pat. No. 4,176,050 is described a catalytic dewaxing process for lube oil stocks over microcrystalline ZSM-5 type catalysts. The entire contents of that patent are incorporated herein by reference.

In U.S. Pat. No. 4,181,598 is described a multi-step process for preparing a high quality lube base stock oil having a pour point not greater than +30° F. from a waxy crude oil by solvent refining, catalytically dewaxing the raffinate in admixture with hydrogen over a zeolite catalyst such as ZSM-5, hydrotreating the dewaxed oil and separating off the low boiling, low molecular weight products of dewaxing. The entire contents of that patent are incorporated herein by reference.

It is an object of this invention to provide a process for preparing a high quality lube base stock having a pour point not greater than +20° F. from a waxy crude oil. It is a further object of this invention to provide a single-step process for preparing a high quality lube base stock employing one catalyst.

This invention is concerned with a catalytic dewaxing operation which results in the production of a lubricating oil having an enhanced V.I. at a given pour point. It should be recognized that there are certain values of pour point which lubricating oils must possess to be commercially useful. Although there is a certain amount of flexibility concerning pour point specification, nevertheless, target pour points for products differ depending on the stocks being produced. In general, it is necessary that the pour point of a heavy neutral stock be no higher than about 20° F. The expression "heavy neutral" is intended to include a stock typically having the following properties:

|  | Charge | Product |
|---|---|---|
| API Gravity | 29.2 | 27.8 |
| Pour Point, °F. | 105 | 20 |
| Viscosity, cs |  |  |
| KV at 100° F. | 81.9 | 108.4 |
| KV at 210° F. | 9.95 | 10.99 |
| Boiling Range (IBP-95%), °F. | 632-970 | 669-983 |

It is a further object of this invention to provide an improved, novel catalyst.

BRIEF DESCRIPTION OF THE DRAWINGS

FIG. 5 is a plot of pour point of the 650° F.+ versus viscosity index for the catalysts of Example 7.

FIG. 6 is a plot of reaction temperature versus pour point of the 650° F.+ fraction for the catalysts of Examples 8 and 9.

FIG. 7 is a plot of pour point of the 650° F.+ fraction versus viscosity index for the catalysts of Examples 8 and 9.

FIG. 8 is a plot of pour point of the 650° F.+ versus viscosity index for the catalysts of Example 10.

FIG. 9 is a plot of pour point of the 650° F.+ fraction versus viscosity index for the catalysts of Examples 11 and 12.

FIG. 10 is a plot of reaction temperature versus pour point of the 650° F.+ fraction for the catalyst of Example 13.

SUMMARY OF THE INVENTION

Figure 1:
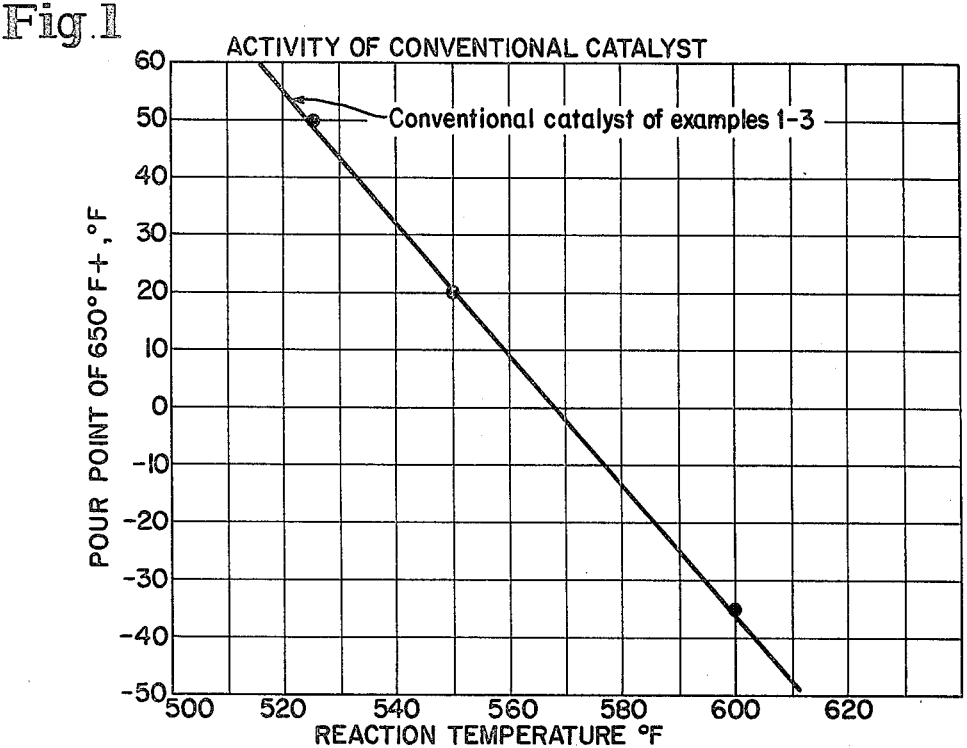
FIG. 1 is a plot of reaction temperature versus pour point of the 650° F.+ fraction for the co-mentioned catalysts of Examples 1-3.

Hydrodewaxing activity is enhanced by using an improved catalyst in a single-stage process. This procedure is beneficial in preparing high quality lube base stock oils used, for example, in hydraulic fluids, motor oils, turbine oils, marine oils and gear lubricants. The first step after preparation of a distillate fraction of suitable boiling range is extraction with a solvent which is selective for aromatic hydrocarbons, e.g., furfural, phenol, or chlorex, to remove undesirable components of the fraction. With a short residuum fraction, it is required to propane deasphalt the residuum prior to solvent extraction. In some instances, such as with a cylinder stock, solvent extraction of the deasphalted short residuum may be omitted. The raffinate from solvent refining or propane deasphalting a short residuum is then catalytically reacted in admixture with hydrogen over a catalyst of an aluminosilicate zeolite having a silica to alumina ratio greater than 12 and a constraint index of 1 to 12 in combination with molybdenum or nickel-molybdenum or cobalt-molybdenum. Conducting the process at conditions more fully specified hereinafter results in a high quality lube base stock oil. The one-stage system would result in major savings in capital costs over the present multi-stage process thereby rendering the present invention an attractive and economical alternative to the prior art. A novel and improved catalyst for hydrodewaxing is also contemplated in this invention. The catalyst of this invention is useful in all operations where both hydrodewaxing and hydrogenation activity are desirable.

DESCRIPTION OF SPECIFIC EMBODIMENTS

The wax base crudes (sometimes called "paraffin base") from which the charge stock is derived by distillation constitute a well recognized class of crude petroleums. Many scales have been devised for classification of crude, some of which are described in Chapter VII Evaluation of Oil Stocks of "Petroleum Refinery Engineering", W. L. Nelson, McGraw-Hill, 1941. A convenient scale identified by Nelson at page 69 involves determination of the cloud point of the Bureau of Mines "Key Fraction No. 2" which boils between 527° F. and 572° F. at 40 mm pressure. If the cloud point of this fraction is above 5° F., the crude is considered to be wax base.

In practice of the present invention, a propane-deasphated short residuum fraction having an initial boiling point of at least about 450° F. and a final boiling point less than about 1100° F. is prepared by distillation of such wax base crude. That fraction is solvent refined by countercurrent extraction with at least an equal volume (100 vol. %) of a selective solvent such as furfural. It is preferred to use about 1.5 to about 3.0 volumes of solvent per volume of oil. The furfural raffinate is subjected to catalytic dewaxing by mixing with hydrogen and contacting the raffinate at 500° F. to 675° F. and at a liquid hourly space velocity (LHSV) of 0.1 to 2.0 volumes of charge oil per volume of catalyst per hour with a catalyst containing molybdenum or nickel-molybdenum or cobalt-molybdenum and zeolite ZSM-5 or other aluminosilicate zeolite having a silica/alumina ratio above 12 and a constraint index of 1 to 12. The amounts of nickel and molybdenum added to the catalyst are generally small, e.g. about 3 to 20 wt. %, based on total catalyst. The preferred space velocity is 0.5 to 1.0 LHSV. The reaction is carried out at a hydrogen partial pressure of 150 to 1500 psia, at the reactor inlets, and preferably at 250 to 500 psia, with 500 to 5000 standard cubic feet of hydrogen per barrel of feed (SCF/B), preferably 1500 to 2500 SCF/B.

The one-step hydrodewaxing-hydrogenation reaction process incorporating the herein described novel catalyst catalytically dewaxes and reduces the olefinic content of the lube oil product. By this means it is possible to produce a stable, high-quality lube base stock oil having a pour point even below −65° F.

The single catalyst employed in the single-step process and the reaction temperature are important to the success in obtaining good yields and a low pour point product.

The solvent extraction technique is well understood in the art and needs no detailed review here. The severity of extraction is adjusted to the composition of the charge stock to meet specifications for the particular lube base stock and the contemplated end-use; this severity will be determined in practice of this invention in accordance with well established practices.

The dewaxing catalyst is a composite of molybdenum or nickel-molybdenum or cobalt-molybdenum, associated with the acid form of a select class of aluminosilicate zeolites having a silica/alumina ratio of at least about 12 and a constrained access to the intracrystalline free space, as more fully described hereinbelow.

An important characteristic of the crystal structure of this class of zeolites is that it provides constrained access to and egress from the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oyxgen atoms themselves being bonded to the silicon or aluminum atoms at the centers of the tetrahedra. Briefly, the preferred type zeolites useful in this invention posesses, in combination: a silica to alumina mole ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude any aluminum or silicon in the binder or in cationic or other form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e., they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although, in some instances, excessive puckering or pore blockage may render these zeolites ineffective. Twelve-membered rings do not generally appear to offer sufficient constraint to produce the advantageous conversions, although puckered structures exist such as TMA offretite which is a known effective zeolite. Also, structures can be conceived, due to pore blockage or other cause, that may be operative.

Rather than attempt to judge from crystal structure whether or not a zeolite possesses the necessary constrained access, a simple determination of the "constraint index" may be made. This test is described in *Journal of Catalysis*, 67, 218–222 (1981) and it involves passing continuously a mixture of an equal weight of normal hexane and 3-methylpentane over a small sample, approximately 1 gram or less, of catalyst at atmospheric pressure according to the following procedure. A sample of the zeolite in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. Zeolites suitable for the present invention are those having a constraint index in the approximate range of 1 to 12. Constraint Index (CI) values for some typical zeolites are:

| CAS | CI |
| --- | --- |
| ZSM-5 | 8.3 |
| ZSM-11 | 8.7 |
| ZSM-12 | 2 |

| -continued | |
| --- | --- |
| CAS | CI |
| ZSM-38 | 2 |
| ZSM-35 | 4.5 |
| TMA Offretite | 3.7 |
| ZSM-Beta | 0.6 |
| ZSM-4 | 0.5 |
| H—Zeolon | 0.4 |
| REY | 0.4 |
| Amorphous Silica-Alumina | 0.6 |
| Erionite | 38 |

It is to be realized that the above constraint index values typically characterize the specified zeolites but that such are the cumulative result of several variables used in determination and calculation thereof. Thus, for a given zeolite depending on the temperature employed within the aforenoted range of 550° F. to 950° F., with accompanying conversion between 10% and 60%, the constraint index may vary within the indicated approximate range of 1 to 12. Likewise, other variables such as the crystal size of the zeolite, the presence of possible occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination, with probability, in some instances, of compounding variable extremes. However, in all instances, at a temperature within the above-specified range of 550° F. to 950° F., the constraint index will have a value for any given zeolite of interest herein within the approximate range of 1 to 12.

The class of zeolites defined herein is exemplified by ZSM-5, ZSM-11, ZSM-12, ZSM-35, ZSM-38, and other similar materials. U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-35 is more particularly described in U.S. Pat. No. 4,016,245, the entire contents of which is incorporated herein by reference.

ZSM-38 is more particularly described in U.S. Pat. No. 4,046,859, the entire contents of which are incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1000° F. for one hour, for example, followed by base exchange with ammonium salts followed by calcination at 1000° F. in air. The presence of organic cations in the forming solution may not be absolutely essential to the formation of this type of zeolite; however, the presence of these cations does appear to favor the formation of this special type of zeolite. More generally, it is desirable to activate this type of catalyst by base exchange with ammonium salts followed by calcination in air at about 1000° F. for from about 15 minutes to about 24 hours.

Natural zeolites may sometimes be converted to this type of zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred crystalline aluminosilicates are ZSM-5, ZSM-11, ZSM-12, ZSM-38, and ZSM-35, with ZSM-5 particularly preferred.

In a preferred aspect of this invention, the zeolites hereof are selected as those having a crystal framework density, in the dry hydrogen form, of not substantially below about 1.6 grams per cubic centimeter. It has been found that zeolites which satisfy all three of these criteria are most desired. Therefore, the preferred zeolites of this invention are those having a constraint index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pycnometer techniques. For example, it may be determined by immersing the dry hydrogen form of the zeolite in an organic solvent which is not sorbed by the crystal. It is possible the unusual sustained activity and stablility of this class of zeolites is associated with its high crystal anionic framework density of not less than about 1.6 grams per cubic centimeter. This high density, of course, must be associated with a relatively small amount of free space within the crystal, which might be expected to result in more stable structures. This free space, however, is important as the locus of catalytic activity.

Crystal framework densities of some typical zeolites are:

| ZEOLITE | VOID VOLUME | FRAMEWORK DENSITY |
| --- | --- | --- |
| Ferrierite | 0.28 cc/cc | 1.76 g/cc |
| Mordenite | .28 | 1.7 |
| ZSM-5, −11 | .29 | 1.79 |
| Dachiardite | .32 | 1.72 |
| L | .32 | 1.61 |
| Clinopilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .41 | 1.55 |
| Levynite | .41 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable ions of Group IB to VIII of the Periodic Table, including, by way of example, nickel, copper, zinc, palladium, calcium or rare earth metals.

In practicing the desired conversion process, it may be desirable to incorporate the above described crystalline aluminosilicate zeolite in another material resistant to the temperature and other conditions employed in the process. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the subbentonites and the kaolins commonly known as Dixie, McNamee-Georgia and Florida clays or others in which the main mineral consistuent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-beryllia, silica-titania as well as ternary compositions, such as silica-alumina-thoria, silica-alumina-zirconia, silica-alumina-magnesia and silica-magnesia-zirconia. The matrix may be in the form of a co-gel. The relative proportions of zeolite component and inorganic oxide gel matrix may vary widely with the zeolite content ranging from between about 1 to about 99 percent by weight and more usually in the range of about 5 to about 80 percent by weight of the composite.

In the preparation of the catalyst, the original cations associated with the zeolite may be replaced with a variety of other cations according to techniques well known in the art.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. No. 3,140,249; U.S. Pat. No. 3,140,251; and U.S. Pat. No. 3,140,253 incorporated herein by reference.

Following contact with a solution of the desired replacing cation, the zeolite is then preferably washed with water and dried at a temperature ranging from 150° F. to about 600° F. for periods of time ranging from 1 to 48 hours or more. It has been further found that catalysts of improved selectivity and other beneficial properties are obtained by subjecting the zeolite to treatment with steam at elevated temperatures ranging from 800° F. to 1500° F. The treatment may be accomplished in atmospheres of 100% steam or an atmosphere consisting of steam and a gas which is substantially inert to the zeolites.

Prior to use, the zeolites should be at least partially dehydrated. This can be done by heating the zeolite to a temperature in the range of 400° F. to 1100° F. in an inert atmosphere, such as air, nitrogen, etc. and at atmospheric or subatmospheric pressures for between 1 and 48 hours. Dehydration can also be performed at lower temperatures merely by using a vacuum, but a longer time is required to obtain sufficient amount of dehydration.

As has heretofore been pointed out, the novel process of this invention is concerned with dewaxing of hydrocarbon feedstocks. The term "dewaxing" as used in the specification and claims is used in its broadest sense and is intended to mean the removal of those hydrocarbons which readily solidify (waxes) from petroleum stocks.

In the multi-step process of U.S. Pat. No. 4,181,598, the catalytic dewaxing of raffinate is conducted at 500° F. to 675° F., and the product hydrotreated in the following step to saturate olefins and improve product color. Olefin saturation is necessary to produce lubes that are stable in quality tests. The bromine number test is a measure of unsaturation.

Example 3 of U.S. Pat. No. 4,181,598 illustates the preparation of a satisfactory heavy neutral by the multi-step process of that invention. A furfural raffinate was catalytically dewaxed over a nickel containing HZSM-5 catalyst and then hydrotreated over a commercial cobalt moly-alumina catalyst. They reported the following for the heavy neutral product:

| | |
|---|---|
| Bromine No. | 0.9 |
| Pour Point, °F. | +20 |
| V.I. | 92 |
| Cat 1-H, 240 Hrs. (Formulated) | |
| WTD | 53 |
| TGF, % | 8 |
| Assessment | Pass |

Thus, a +20° F. pour point heavy neutral of 0.9 Bromine Number passes the Caterpillar 1-H stability test.

Although sulfur in the product may not be directly related to product quality, some desulfurization is confirmatory of the effectiveness of the hydrogenation by the CoMo, NiMo and Mo component in the catalysts of the present invention.

The improved process of this invention will now be illustrated by examples which are not to be construed as limiting the invention as described in this specification including the attached claims. All parts and proportions in these examples are by weight unless explicitly stated to be otherwise.

The catalysts in the following examples were tested in a batch, shaker bomb unit that has been described in Ind. Eng. Chem., Vol. 50, page 47 (1958). The unit consists of a cylindrical one-liter pressure vessel mounted at the end of a reciprocating piston. An engine drives the piston up and down 200 strokes per minute. While the bomb is shaken in this manner, it moves through the center of a stationary induction coil. The bomb serves as a susceptor, and its contents are heated inductively to 550° F. in 2 to 3 minutes. At the end of a run, the reactor is cooled in 2 to 3 minutes using a water spray. A thermocouple is located in a central thermowell. The reactor is connected to a pressurized gas system through loops of flexible tubing; hydrogen is supplied during the reaction period to maintain pressure. The charge stock was a heavy neutral furfural raffinate having the following properties:

| | |
|---|---|
| API Gravity | 29.2 |
| Pour Point, °F. | 105 |
| Kinematic Viscosity, cs | |
| at 130° F. | 38.72 |
| at 210° F. | 9.26 |
| Sulfur, wt. % | 0.74 |
| CCR, wt. % | 0.11 |
| Nitrogen, ppm | 42 |
| Aniline Point, °F. | 233.0 |
| Distillation D1160, IBP | 769° F. |
| 10% | 845° F. |
| 30% | 878° F. |
| 50% | 897° F. |
| 70% | 911° F. |
| 90% | 931° F. |
| 95% | 937° F. |

EXAMPLES 1-3

These examples illustrate catalytic dewaxing with a commercially prepared catalyst containing the typical 0.9% Ni by exchange but not containing an additional hydrogenating component. This is considered the conventional catalyst.

A commercially prepared zeolite catalyst (65% ZSM-5/35% Al$_2$O$_3$) was steamed at 900° F.; it had a 76 alpha activity, typical of catalysts used for lube stock hydrodewaxing.

As is well known in the art, the alpha activity gives an approximate indication of the acid activity of the catalyst compared to a standard catalyst and it gives the relative rate constant (rate of normal hexane conversion per volume of oxide composition per unit time). It is based on the activity of the highly active silica/alumina cracking catalyst taken as an alpha of 1. This test is described in U.S. Pat. No. 3,354,078 and in *The Journal of Catalysis*, Vol. 4, pp. 522-529, August 1965, incorporated herein by reference.

The steamed catalyst, Catalyst A, was tested as described above under conditions listed in Table I

TABLE 1

| EXAMPLE | 1 | 2 | 3 |
|---|---|---|---|
| Catalyst | A | A | A |
| Hydrogen Pressure, psig | 500 | 500 | 500 |
| Time on Stream, min. | 130 | 130 | 130 |
| Oil/Catalyst Ratio, by weight | 5 | 5 | 5 |
| Average Catalyst Temp., °F. | 525 | 550 | 600 |

The products were distilled under vacuum to obtain a 650° F.+ bottoms which was tested for pour point, bromine number and kinematic viscosity at 40° C. and 100° C. The results are given in Table II.

TABLE II

| EXAMPLE | 1 | 2 | 3 |
|---|---|---|---|
| Pour Point, °F. | 50 | 20 | −35 |
| Kinematic Viscosity at 40° C., cs | 91.88 | 101.7 | 119.2 |
| Kinematic Viscosity at 100° C., cs | 10.66 | 11.07 | 11.58 |
| Viscosity Index | 98.7 | 92.9 | 80.9 |
| Bromine No. | 1.5 | 1.4 | 2.3 |

Figure 2:
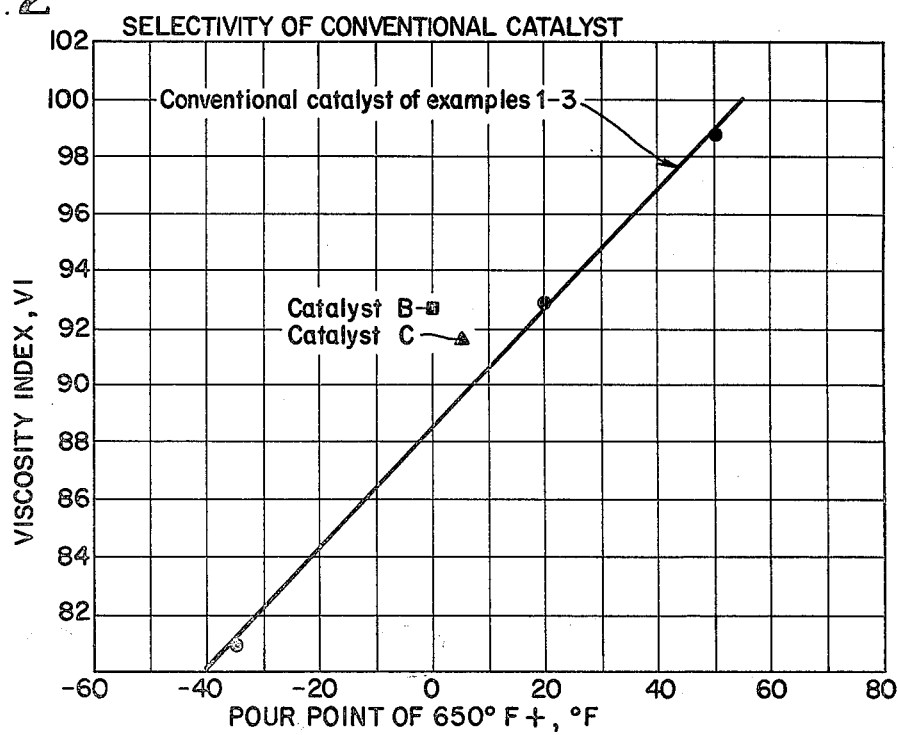
FIG. 2 is a plot of pour point of the 650° F.+ versus viscosity index for the catalysts of Examples 1-5.

These results are plotted for reference in FIGS. 1 and 2.

EXAMPLES 4-5

The same chargestock as used in Examples 1-3 was contacted with Catalyst A impregnated with ammonium heptamolybdate, hereinafter referred to as Catalyst B. Catalyst A was impregnated with ammonium heptamolybdate such that about 3 ½% molybdenum trioxide resulted therein. The newly formed Catalyst B was then dried at 250° F. for about 16 hours and then calcined for 10 hours at 1000° F. The catalyst was evaluated as in Examples 1-3 at 550° F. The catalyst of Example 5, hereinafter referred to as Catalyst C, was prepared similarly to Example 4 except that the catalyst was further impregnated with cobaltous chloride solution following impregnation with ammonium heptamolybdate such that about 1.2% cobaltous oxide resulted therein. Catalyst C was then dried, calcined, and tested in the same manner as Example 2. The results of Example 4 and 5 are shown in Table III.

TABLE III

| EXAMPLE | 4 | 5 |
|---|---|---|
| Catalyst | B | C |
| Temperature, °F. | 550 | 550 |
| Pour Point, °F. | 0 | 5 |
| Kinematic Viscosity at 40° C., cs | 100.5 | 102.7 |
| Kinematic Viscosity at 100° C., cs | 10.97 | 11.12 |
| Viscosity Index | 92.7 | 91.7 |
| Bromine No. | 0.5 | 0.6 |

A comparison of the results of reacting the stated chargestock over Catalysts A, B, and C at 550° F. is shown in Table IV.

TABLE IV

| CATALYST | A | B | C |
|---|---|---|---|
| Metals, by impregnation, wt. % | | | |
| MoO$_3$ | — | 3.5 | 3.5 |
| CoO | — | — | 1.2 |
| Pour Point, °F. | 20 | 0 | 5 |
| Viscosity Index | 92.9 | 92.7 | 91.7 |
| Bromine No. | 1.4 | 0.5 | 0.6 |

Compared to Catalyst A, the concept catalysts of this invention (Catalysts B and C) exhibit greater hydrodewaxing activity as indicated by low pour point values relative to Catalyst A. Concept Catalysts B and C show a greater viscosity index/pour relationship. This is shown more clearly in FIG. 2. It is important to have the highest possible viscosity index for a given pour point in high quality lube base stock oil. The higher viscosity index of the product results in less dependence upon expensive additives to compensate for a low viscosity index. Finally, the product of Catalysts B and C has a bromine number less than the product of the Catalyst A indicating a product superior in stability.

EXAMPLE 6

Conventional catalyst of Example 1 (with 0.9 wt. % Ni by exchange) was used to prepare another 1.2 wt. % CoO 3.5 wt. % MoO$_3$ catalyst SMO-9820 using the procedure described in Example 5. It was tested like the conventional catalyst of Example 1 at 525, 550 and 575° F. with the following results:

| Temperature, °F. | 525 | 550 | 575 |
|---|---|---|---|
| 650° F. + Properties | | | |
| Pour Point, °F. | 35 | 5 | −25 |
| Kinematic Visc., cs | | | |
| @40° C. | 96.46 | 99.22 | 101.1 |
| @100° C. | 10.92 | 10.82 | 10.81 |
| VI | 97.0 | 91.7 | 89.1 |
| Bromine No. | 0.6 | 1.1 | 1.0 |
| Sulfur, wt. % | 0.70 | 0.58 | 0.52 |

Figure 3:
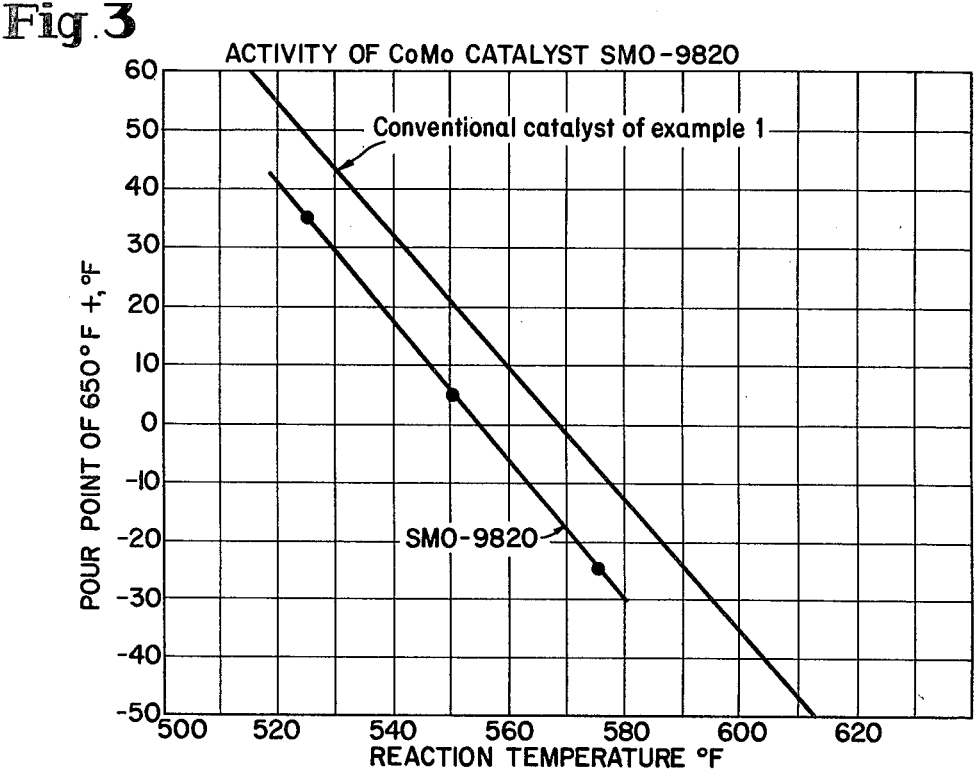
FIG. 3 is a plot of reaction temperature versus pour point of the 650° F.+ fraction for the catalyst of Example 6.

The hydrodewaxing activity of SMO-9820 is significantly higher than the conventional catalyst without impregnated CoMo as shown more clearly in FIG. 3. SMO-9820 dewaxes to a lower pour point than conventional catalyst.

Figure 4:
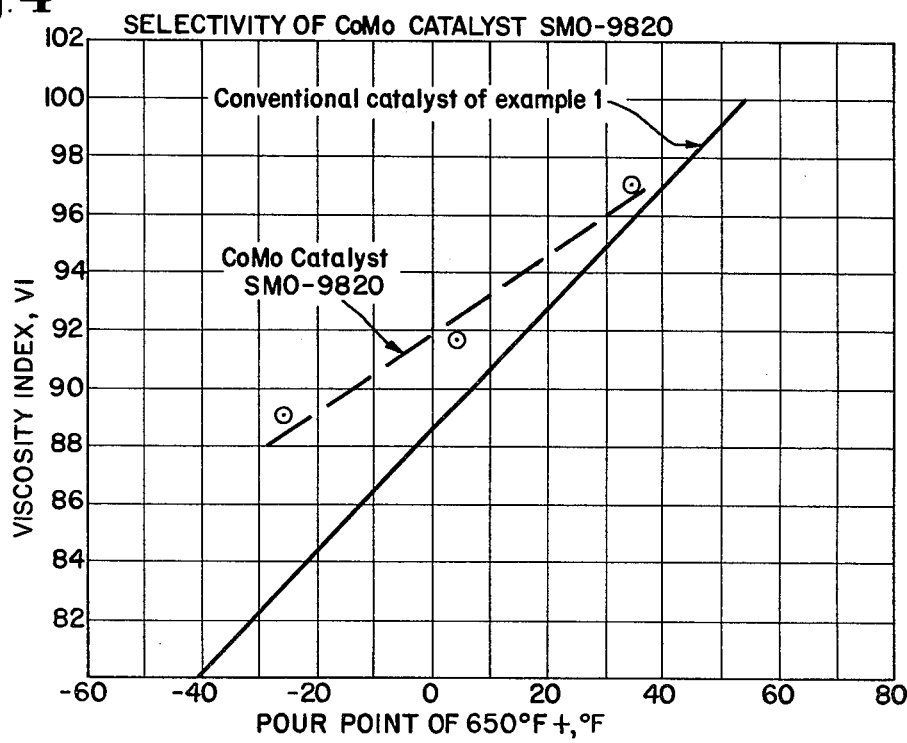
FIG. 4 is a plot of pour point of the 650° F.+ fraction versus viscosity index for the catalyst of Example 6.

The better pour point/VI relationship of the CoMo catalyst SMO-9820 is illustrated in FIG. 4, particularly in the range of low pour point, +20° to −25° F.

EXAMPLE 7

Conventional catalyst of Example 1 was impregnated with ammonium heptamolybdate and cobalt chloride solutions to various levels of MoO$_3$ and CoO. These were tested as in Example 1 at 550° F. for dewaxing with the following results:

| Impregnated Metals, wt. % | | | | | |
|---|---|---|---|---|---|
| CoO | 0 | 0.5 | 1 | 2 | 3 |
| MoO$_3$ | 0 | 2.5 | 5 | 10 | 15 |
| 650° F. + Properties | | | | | |
| Pour Point, °F. | 20 | 5 | 10 | 5 | 10 |
| Kinematic Visc., cs | | | | | |
| @40° C. | 101.7 | 100.2 | 105.5 | 104.0 | 96.09 |
| @100° C. | 11.07 | 10.91 | 11.37 | 11.16 | 10.74 |
| VI | 92.9 | 92.0 | 92.5 | 91.6 | 94.4 |
| Bromine No. | 1.4 | 0.9 | — | 0.6 | 0.3 |
| Sulfur, wt. % | 0.95 | 0.69 | 0.67 | 0.51 | 0.50 |
| Catalyst No. SMO- | 9703* | 9743 | 9744 | 9745 | 9746 |

*Example 1

These results show that impregnating conventional catalysts with as little as 0.5 wt. % CoO - 2.5 wt. % MoO$_3$ results in increased dewaxing activity, improved pour point/VI selectivity (see FIG. 5), reduced unsaturation (lowers Bromine No.), and lower sulfur level of product. These indicate that product properties are controllable by adjusting the CoO-MoO$_3$ level in the catalyst.

EXAMPLES 8-9

These examples illustrate that CoMo and NiMo catalysts appear equivalent.

The catalysts of Examples 8 and 9 were prepared by impregnating a conventional catalyst like that of Example 5, with the exception that there was no nickel exchange. The catalyst of Example 8 was prepared to 1.2 wt. % CoO - 3.5 wt. % MoO$_3$ and that of Example 9 to 1.2 wt. % NiO - 3.5 wt. % MoO$_3$. Both catalysts were tested in the manner of Example 1 over a range of temperature. The results are shown below:

| | Example 8 (CoMo, SMO-9838) | | |
|---|---|---|---|
| Temperature, °F. | 500 | 525 | 550 |
| 650° F. + Properties | | | |
| Pour Point, °F. | 55 | 30 | 5 |
| Kinematic Visc., cs | | | |
| @40° C. | — | 97.20 | 95.07 |
| @100° C. | — | 10.87 | 10.55 |
| VI | — | 95.2 | 92.4 |
| Bromine No. | — | 1.3 | 1.1 |
| Sulfur, wt. % | 0.82 | .74 | .72 |

| | Example 9 (NiMo, SMO-9837) | | |
|---|---|---|---|
| Temperature, °F. | 525 | 550 | 575 |
| 650° F. + Properties | | | |
| Pour Point, °F. | 30 | 5 | −15 |

-continued

| | Example 9 (NiMo, SMO-9837) | | |
|---|---|---|---|
| Kinematic Visc., cs | | | |
| @40° C. | 99.16 | 103.8 | 110.2 |
| @100° C. | 11.04 | 11.14 | 11.4 |
| VI | 95.6 | 91.5 | 88.2 |
| Bromine No. | 0.8 | 0.8 | — |
| Sulfur, wt. % | 0.77 | 0.70 | 0.58 |

The superior activity and selectivity of the catalysts that contain CoMo or NiMo over conventional catalysts are shown clearly in FIGS. 6 and 7.

EXAMPLE 10

The conventional catalyst of Example 1 contains 0.9 wt. % nickel that was introduced by exchanging extrudate with $Ni(NO_3)_2$ solution. The present example shows that the exchanged nickel is *not* necessary in order to benefit from the impregnated hydrogenation component $MoO_3$.

A commercially prepared catalyst of conventional composition 65% ZSM-5/35% $Al_2O_3$ and exchanged to 1.0 wt. % Ni was steamed to 98 alpha activity. It was identified as SMO-9555.

A portion of catalyst SMO-9555 was impregnated to 3 ½ wt. % of $MoO_3$ with ammonium heptamolybdate solution and calcined. It was identified as SMO-9772.

Another commercially prepared catalyst of conventional composition, but *not* exchanged with nickel salt solution, was steamed to 96 alpha activity, impregnated to 3 ½ wt. % MoO3, and calcined. It was identified as SMO-9773.

Catalysts SMO-9555, -9772 and -9773 were tested for dewaxing in the shaker bomb at 550° F. with the results below:

| Ni by exchange, wt. % | 1.0 | 1.0 | None |
|---|---|---|---|
| MoO3 by impregnation, wt. % | None | 3.5 | 3.5 |
| 650° F. + Properties | | | |
| Pour Point, °F. | 25 | 10 | 10 |
| Kinematic Viscosity, cs | | | |
| @40° C. | 101.3 | 95.45 | 94.63 |
| @100° C. | 11.05 | 10.59 | 10.55 |
| VI | 93.1 | 92.6 | 93.0 |
| Cat. No., SMO- | 9555 | 9772 | 9773 |

These data show that catalyst SMO-9773 (which has no nickel) and catalyst SMO-9772 (which has exchanged nickel) are equal in dewaxing activity and VI/pour point selectivity. Also both are more active and selective than catalyst SMO-9555 which has no $MoO_3$. The better selectivity is shown more clearly in FIG. 8.

EXAMPLES 11 AND 12

The catalyst of Example 11 is a commercial product identified as SMO-9704. It comprises 65 wt. % ZSM-5/35 wt. % $Al_2O_3$, contains 0.94 wt. % Ni by exchange, and is unsteamed. It was prepared commercially by combining ZSM-5 zeolite with alpha alumina monohydrate powder, extruding to 1/16" diameter cylinders and calcining in inert gas ($N_2$) to decompose and remove organic cations. This was then exchanged, first with ammonium nitrate solution and then with nickel nitrate solution, followed by drying and calcining. Note that it was this commercial product (SMO-9704) that was steamed in the laboratory to produce the conventional catalyst of Example 1 (SMO-9703).

The catalyst of Example 11, identified as SMO-9704, was tested for dewaxing at 550° F. like the catalyst of Example 1.

The catalyst of Example 12 was prepared by impregnating SMO-9704 to 3 ½ wt. % $MoO_3$ with ammonium heptamolybdate and calcining. It was identified as SMO-9782 and was also tested for dewaxing at 550° F. The results for the unsteamed catalysts of Examples 11 and 12 are shown below:

| MoO3 impregnation, wt. % | None | 3.5 |
|---|---|---|
| 650° F. + Properties | | |
| Pour Point, °F. | 0 | −20 |
| Kinematic Visc., cs | | |
| @40° C. | 106.5 | 104.2 |
| @100° C. | 11.2 | 10.93 |
| VI | 89.2 | 87.3 |
| Bromine No. | 1.8 | — |
| Catalyst No., SMO- | 9704 | 9782 |

It is evident that catalyst SMO-9782 with impregnated molybdenum is more active for reducing pour point (dewaxing) than SMO-9704 without impregnated molybdenum. Catalyst SMO-9782 is also more VI/pour point selective as shown in FIG. 9; catalyst SMO-9704 has a VI/pour point selectivity like conventional catalyst, whereas catalyst SMO-9782 shows an advantage over conventional catalyst.

It is therefore apparent that steaming is not necessary to realize the advantages of impregnation with molybdenum solution.

EXAMPLE 13

This example illustrates another method for preparing a 1.2 wt. % $NiO$-3.5 wt. % $MoO_3$ - (65% ZSM-5/35% $Al_2O_3$) catalyst.

A low sodium (0.02 wt. %) form of ZSM-5 was blended with alpha alumina monohydrate powder (Kaiser SA) in a ratio of 65 wt. % ZSM-5 to 35 wt. % $Al_2O_3$ on an ignited basis. To this blend was added solution of ammonium heptamolybdate first and then nickel nitrate to the specified percentages. The resultant mix was auger-extruded to 1/16" diameter, dried, and calcined in nitrogen at 1000° F. and then in air. It was identified a SMO-9858 and tested for dewaxing in the shaker bomb at 500, 525, and 550 with the following results.

| Temperature, °F. | 500 | 525 | 550 |
|---|---|---|---|
| 650° F. + Bottoms | | | |
| Pour Point, °F. | 70 | 30 | −10 |
| Kinematic Visc., cs | | | |
| @40° C. | — | 99.49 | 101.6 |
| @100° C. | — | 11.10 | 10.81 |
| VI | — | 96.2 | 89.2 |
| Bromine No. | — | 0.7 | — |

The Bromine No. for the +30° F. pour point product indicates a low level of unsaturation.

Figure 11:
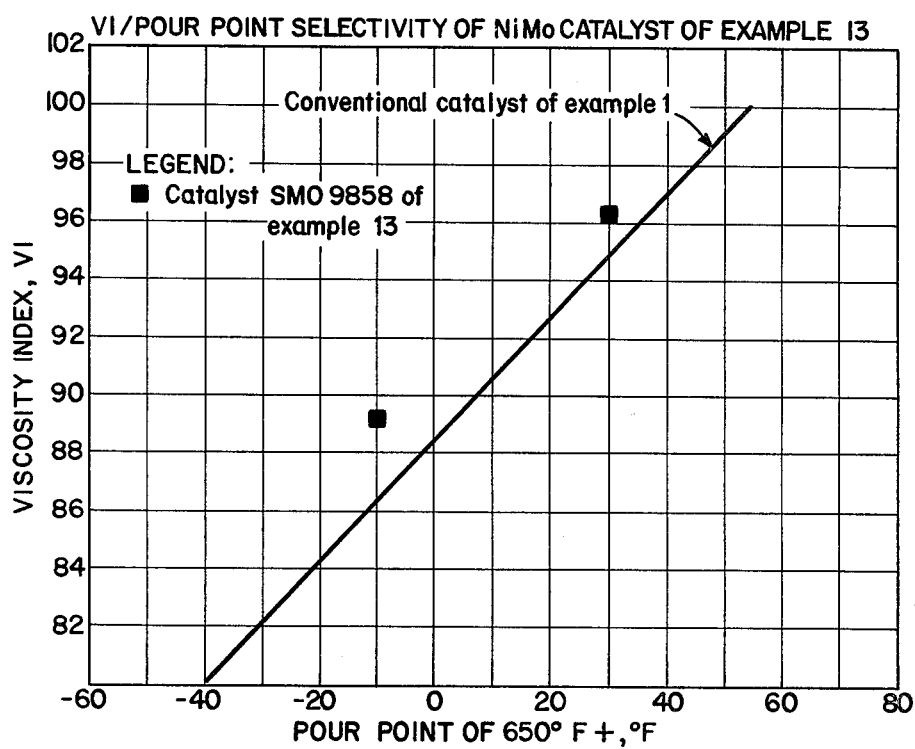
FIG. 11 is a plot of pour point of the 650° F.+ fraction versus viscosity index for the catalyst of Example 13.

The activity results are plotted in FIG. 10 and show a substantial advantage over conventional catalyst. The VI/pour point results are plotted in FIG. 11 and show an advantage over conventional catalyst which has no impregnated nickel or molybdenum.

What is claimed is:

1. In the process for hydrodewaxing a waxy lube stock having a high pour point wherein said waxy lube stock is contacted under reaction conditions in a single stage with a hydrodewaxing catalyst comprising as the sole zealite an aluminosilicate zeolite of the ZSM-5 type having a silica/alumina ratio of at least about 12 and a constraint index of 1 to about 12 the improvement which comprises reducing the pour point of said waxy lube stock to not greater than +20° F. and increasing the viscosity index of said waxy lube stock relative to the pour point obtained by incorporating onto said catalyst a hydrogenation component comprising molybdenum, cobalt-molybdenum or nickel-molybdenum, said hydrogenation component being present in an amount ranging from about 3 to 20 weight percent based on the total catalyst.

2. The process of claim 1 wherein said waxy lube stock is contacted with said catalyst at a temperature of about 500° F. to about 675° F.

3. The process of claim 1 wherein said catalyst comprises an aluminosilicate zeolite having a crystal framework density of not less than 1.6 grams per cubic centimeter.

4. The process of claim 1 wherein said catalyst is ZSM-5 containing nickel-molybdenum.

5. The process of claim 1 wherein said catalyst is ZSM-5 containing molybdenum.

6. The process of claim 1 wherein said catalyst is ZSM-5 containing cobalt-molybdenum.

* * * * *